UNITED STATES PATENT OFFICE.

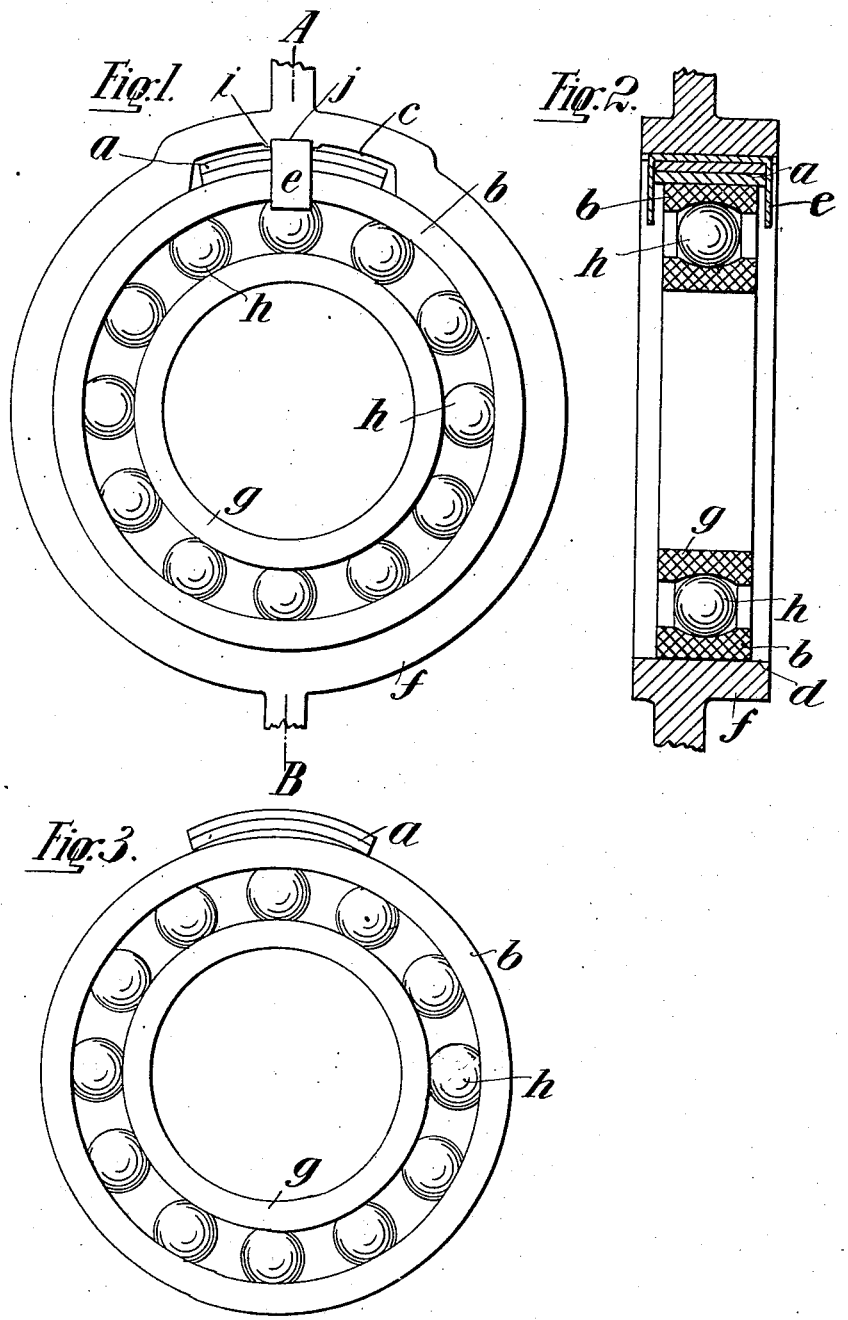

ANTON KUNKEL, OF ARBON, SWITZERLAND, ASSIGNOR TO THE FIRM OF ADOLPH SAURER MASCHINENFABRIK, OF ARBON, SWITZERLAND.

BALL-BEARING LOCK.

977,655.  Specification of Letters Patent.  Patented Dec. 6, 1910.

Application filed May 10, 1910. Serial No. 560,509.

*To all whom it may concern:*

Be it known that I, ANTON KUNKEL, a citizen of the Confederation of Switzerland, residing at Arbon, in Switzerland, have invented a new and useful Ball-Bearing Lock, of which the following is a specification.

In automobiles and the like the ball-bearings are frequently introduced into the respective casings in the manner, that their outer race rings are forced into the cavities of the castings so as to prevent them from loosening which would be objectionable for the life of the ball-bearings. As, however, the said castings are frequently of aluminium, at any rate always of a metal softer than the material of the ball-bearings, the said manner of securing the outer race rings of the ball-bearings presents the defect, that under the varying load the ball-bearing is apt to loosen after some time and to fall out of the casing.

My invention relates to improvements in such ball-bearings, whereby the loosening of the ball-bearing is rendered most difficult.

The chief improvement consists in elastic plates bent so as to form springs, which are forced with the ball-bearing into the casting, the springs engaging in one or several recesses and made to bear close on the outer ring of the ball-bearing in one or several directions opposite to that or those, in which forces tending to loosen the ball-bearing mostly occur. Thereby any play, that may be produced between the ball-bearing and the casing by repeated shocks or blows or by wear and tear will be neutralized by the springs.

Another improvement consists in means for preventing the springs from endwise-motion.

I will now proceed to describe my invention with reference to the accompanying drawing, in which—

Figure 1 is an elevation of a ball-bearing embedded in a casting and therein secured by a lock according to my invention, Fig. 2 is a cross section through the same on the line A—B in Fig. 1, and Fig. 3 is an elevation of the ball-bearing alone and a spring in its normal state bearing on the same.

Similar characters of reference refer to similar parts throughout the several views.

$f$ is a casting, which is bored so that its cylindrical inside $d$ can serve as a casing for a ball-bearing of any known construction, which is shown to consist of an outer race ring $b$, an inner race ring $g$ and a plurality of balls $h$. The casting $f$ may be of any known construction and may be made integral with the frame or machine part of an automobile or the like. According to my invention a recess $c$ is provided in the casting $f$. Into this recess $c$ a spring $a$ is forced, preferably at the same time that the outer ring $b$ is forced into the inside $d$ of the casting $f$. The spring $a$ is shown to be made from two pieces of elastic steel plates so bent, that their inner radius of curvature is shorter than the radius of the outer periphery of the race ring $b$, as is clearly shown in Fig. 3. Preferably a small projection $i$ is provided on the inside of the recess $c$ in its middle, against which the spring $a$ is made to bear.

By forcing in the spring $a$ it will be pressed close on the surface of the outer race ring $b$ and thus strained, so that it will strongly press on the ring $b$ and prevent the ball-bearing from shifting as well as from loosening.

In order to prevent the spring $a$ from endwise motion a doubly bent steel plate $e$ passing across the spring $a$ and over its side faces may be simultaneously forced with the spring $a$ into the recess $c$, a cross channel $j$ being preferably provided in the projection $i$ for receiving the hook $e$. The steel plate from which the hook $e$ is made, need not be so thick as the steel plates of the spring $a$, it may be made thinner. Where so preferred, however, the hook $e$ may be omitted.

Should circumstances render it advisable or desirable, more than one spring $a$ with or without hook $e$ may be employed, the two or several springs being disposed on different places of the outer race ring $b$.

I claim:

1. The combination with a ball-bearing comprising an outer race ring, of a casing adapted to receive the outer race ring of said ball-bearing and having a recess with a cross channel in its middle, a steel spring adapted to be forced into said recess and to bear close on the outside of said outer race ring, and a hook forced into the cross channel in the recess of said casing and adapted to prevent said steel spring from endwise motion.

2. The combination with a ball-bearing comprising an outer race ring, of a casing adapted to receive the outer race ring of said ball-bearing and having a recess with a transversely recessed projection in its middle, a steel spring adapted to be forced into said recess and to bear close on the outside of said outer race ring, and a hook forced into the transversely recessed projection in the recess of said casing and adapted to prevent said steel spring from endwise motion.

ANTON KUNKEL.

Witnesses:
  EUGENE NABEL,
  ALBERT PHILLIPS.